United States Patent

Shinohara et al.

[11] Patent Number: 5,118,564
[45] Date of Patent: Jun. 2, 1992

[54] LONGITUDINAL MAGNETIC RECORDING MEDIA WITH FINE GRAIN CRYSTAL MAGNETIC LAYER

[75] Inventors: Tadashi Shinohara; Koji Ichikawa, both of Ibaraki; Shigeo Fujii, Tsuchiura, all of Japan

[73] Assignee: Hitachi Metals, Ltd., Tokyo, Japan

[21] Appl. No.: 509,770

[22] Filed: Apr. 17, 1990

[30] Foreign Application Priority Data

Apr. 26, 1989 [JP] Japan ................. 1-106703

[51] Int. Cl.$^5$ ............................................. G11B 23/00
[52] U.S. Cl. ..................................... 428/336; 428/611; 428/678; 428/694; 428/900
[58] Field of Search ............... 428/611, 667, 678, 694, 428/900, 978, 336; 427/131, 132

[56] References Cited

U.S. PATENT DOCUMENTS

| | | | |
|---|---|---|---|
| 4,552,820 | 11/1985 | Lin et al. | 428/667 |
| 4,610,911 | 9/1986 | Opfer et al. | 428/667 |
| 4,632,883 | 12/1986 | Howard et al. | 428/667 |
| 4,677,032 | 6/1987 | Robinson | 428/678 |
| 4,929,514 | 5/1990 | Natarajan et al. | 428/611 |
| 4,950,548 | 8/1990 | Furusawa et al. | 428/928 |
| 5,004,652 | 4/1991 | Lal et al. | 428/928 |
| 5,006,388 | 4/1991 | Kuzuo et al. | 428/611 |

Primary Examiner—Paul J. Thibodeau
Attorney, Agent, or Firm—Finnegan, Henderson, Farabow, Garrett & Dunner

[57] ABSTRACT

The invention discloses a magnetic recording medium used for recording and reproducing information in combination with a magnetic head. The magnetic recording medium in accordance with the present invention comprises a substrate made of a non-magnetic material, an underlayer which is formed on the substrate and has a thickness of 300 to 1000 Å and which consists of a chromium metal or a chromium alloy, and a magnetic recording layer which is formed on the underlayer by vacuum evaporation, which consists essentially of 5 to 15 at% of Cr, 1 to 8 at% of Ta and the balance substantially being Co, and which has a direction of easy magnetization within the surface parallel to the surface of the substrate.

3 Claims, 2 Drawing Sheets

F I G. 2
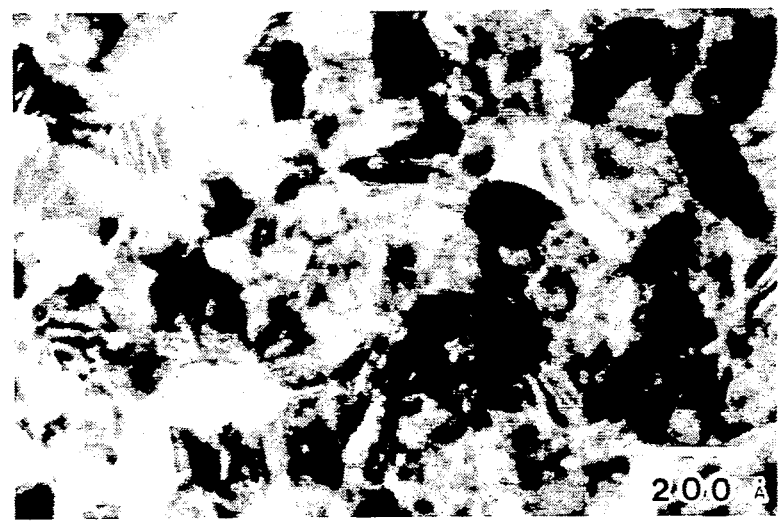

LONGITUDINAL MAGNETIC RECORDING MEDIA WITH FINE GRAIN CRYSTAL MAGNETIC LAYER

BACKGROUND OF THE INVENTION

The present invention relates to magnetic recording media, for example, for recording and reproducing information in combination with magnetic heads, and particularly to magnetic recording media which produce little noise and exhibit improved corrosion resistance and productivity.

Magnetic disk units are generally used for recording information on magnetic recording media or reproducing and outputting information recorded on the media. In cases of such recording or reproducing, a magnetic head and a magnetic recording medium are generally maintained with a small gap, for example, of 0.2 to 0.3 μm, therebetween. A floating head slider is therefore used for preventing friction and wear caused by the contact between the magnetic head and the magnetic recording medium and/or damage caused by collision between them. Namely, the floating head slider employs the hydrodynamic floating force generated by the speed relative to the surface of the magnetic recording medium in a gap between the head slider and the magnetic recording medium so as to keep the small gap therebetween. On the other hand, in recent years, specifications required for magnetic recording media have been gradually made strict, and magnetic layers which may have high recording density have been required.

Such magnetic layers are usually formed by a method of sputtering a Co-Ni-Pt alloy, which is used as a material for forming the magnetic layers, on a substrate with a Ni-P underlayer therebetween. Although the use of this material enables an increase in coercive force of the magnetic layer formed, it has disadvantages with respect to the generation of great noise and high price. In order to remove such disadvantages, some magnetic layers are formed by forming a Co-Ni-Cr layer on a chromium underlayer on a substrate. In the thusformed magnetic layers, although the cost and noise can be reduced to levels lower than those with the above-described material, it is necessary to form a chromium layer having a thickness of 1500 to 3000 Å as an underlayer on a substrate for the purpose of maintaining a predetermined coercive force of the magnetic layer. There is, thus, a problem in that productivity is deteriorated due to the long time required for forming the chromium layer. Although such a structure exhibits the effect of reducing noise to some extent, as compared with the above-described Co-Ni-Pt layer, noise is not yet reduced to a satisfactory level, and there is a problem with respect to its unsatisfactory corrosion resistance.

Each of such magnetic layers comprises the Co-Ni-Cr, Co-Ni-Pt or Co-Pt magnetic layer which is formed on a chromium or chromium-alloy underlayer by sputtering and has an average crystal grain size of 500 to 600 Å.

The magnetic layers are longitudinally magnetized in the direction of a track parallel to the surface of a substrate so that magnetic recording can be made. In order to enable high-density recording by increasing the linear density of a magnetic layer, the coercive force (Hc) of the magnetic layer must be increased. In order to increase the coercive force (Hc), it is necessary to epitaxially grow a cobalt sputtered layer on a chromium underlayer, as disclosed in U.S. Pat. No. 4,652,499. When a cobalt alloy layer is epitaxially grown on a chromium crystal, the grain size of the chromium crystal in an underlayer must be substantially the same as that of the crystal of the cobalt alloy. The chromium crystal grain size is small when the chromium layer is thin, and the crystal grows and the grain size increases with an increase in the thickness. When a magnetic layer is formed by epitaxially growing a cobalt alloy having an average crystal grain size of 500 to 600 Å on a chromium layer, in order to increase the coercive force (Hc) of the magnetic layer formed, the thickness of the chromium layer must be increased so that the crystal grain size of the chromium layer must be the same as that of the cobalt alloy. The thickness of the chromium layer is therefore increased to 1500 to 3000 Å so that the chromium crystal grain size is 500 to 600 Å.

SUMMARY OF THE INVENTION

Accordingly, it is an object of the present invention to provide a magnetic recording medium comprising a magnetic layer formed on a non-magnetic substrate, the magnetic layer having an axis of easy magnetization within the surface of the substrate so that the recording medium produces little noise and has good corrosion resistance and high coercive force even if the chromium or chromium alloy underlayer interposed between the substrate and the magnetic layer is thin. The terms "having an axis of easy magnetization within the surface of the substrate" mean that the magnetic layer can be magnetized in the direction parallel to the surface of the substrate, i.e., the longitudinal direction. When a cobalt-alloy magnetic layer has a hexagonal closed pack (hcp) crystal structure, the terms mean that c-axis components in the magnetic layer are rather large.

It is another object of the present invention to provide a recording medium having good productivity and a thin chromium underlayer.

The above-described objects of the present invention can be achieved by employing a material having a small average crystal grain size as a material for the magnetic layer in a magnetic recording medium.

The material used for the magnetic layer in the magnetic recording medium of the present invention has an average crystal grain size of 100 to 300 Å when it is grown by vacuum deposition on a chromium or chromium-alloy underlayer. The material preferably consists essentially of 5 to 15 at % of chromium (Cr), 1 to 8 at % of tantalum (Ta) and the balance substantially being cobalt (Co). In the magnetic recording medium of the present invention, the substrate is preferably formed by providing the underlayer on an aluminum disk or aluminum-magnesium (3 to 6 wt % Mg) alloy disk, and chromium or a chromium alloy is preferably used for the underlayer. The underlayer may be formed by providing a chromium or chromium alloy sputtered layer on a Ni-P (nickel-phosphor) plating layer.

When a fine cobalt alloy is used in the magnetic layer, as in the present invention, the thickness of a chromium or chromium alloy underlayer is 1000 Å or less, preferably 300 to 1000 Å. When a fine cobalt alloy is grown by vacuum deposition on the chromium underlayer which has a thickness of 1000 Å or less and which is provided by sputtering, the direction of easy magnetization of the cobalt alloy lies parallel to the surface of the substrate, and the medium formed has high coercive force and is thus suitable for longitudinal magnetic recording.

BRIEF DESCRIPTION OF THE DRAWING

FIG. 2 is a photograph of a magnetic layer in accordance with this invention measured by an electron microscopy.

DETAILED DESCRIPTION OF THE EMBODIMENTS

Figure 1:
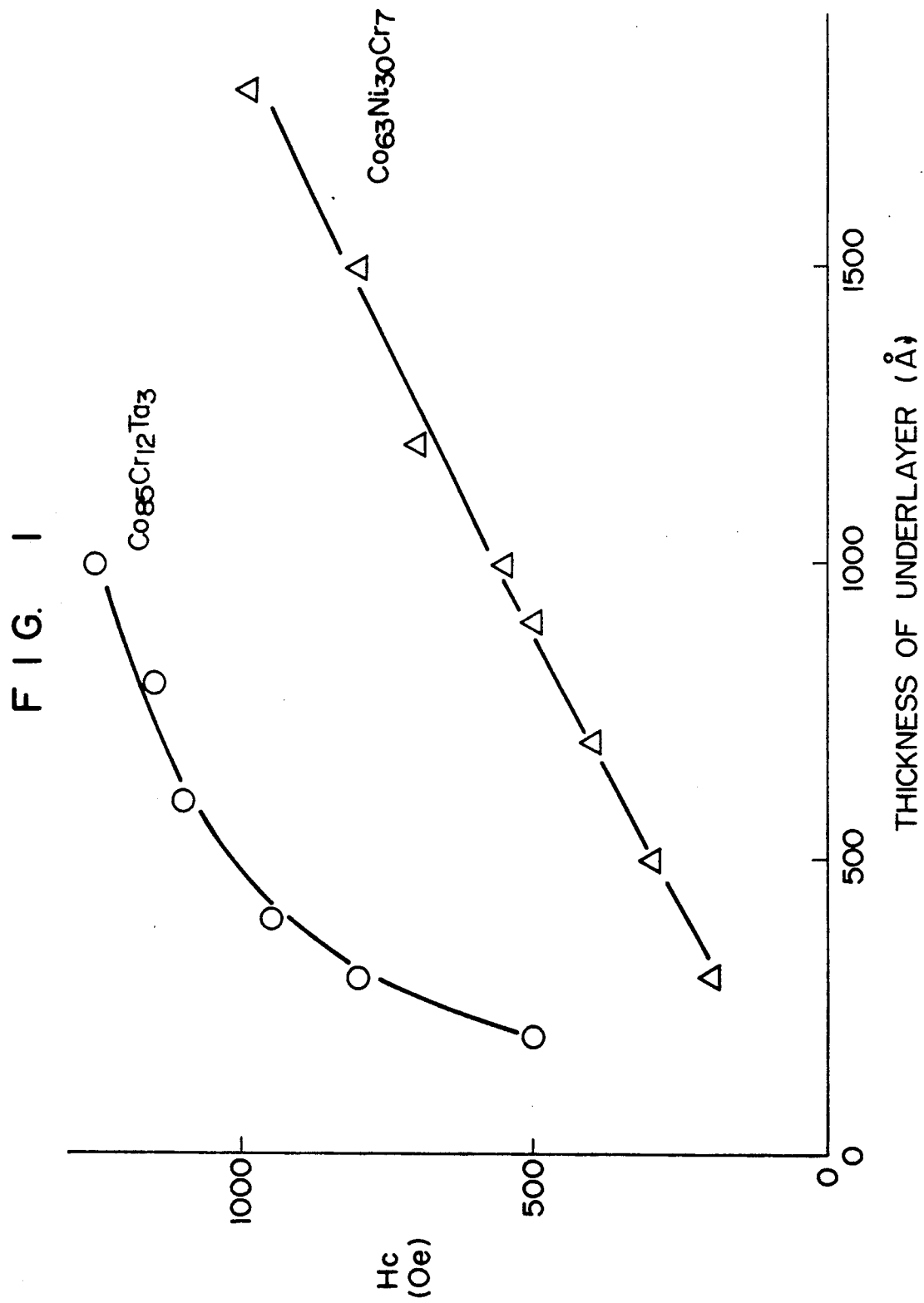
FIG. 1 is a graph which shows a relationship between the coercive force Hc (Oe) and the thickness (Å) of the chromium underlayer of each of the magnetic layer ($Co_{85}Cr_{12}Ta_3$) used in the present invention and a conventional magnetic layer ($Co_{63}Ni_{30}Cr_7$)

The surface of a disk substrate of an aluminum alloy containing 4% by weight of magnesium was made smooth by machining so that the substrate had an external diameter of 95 mm, an internal diameter of 25 mm and a thickness of 1.27 mm. A Ni-P layer of 5 to 15 μm thick was then plated on its surface so as to improve resistance of contact start and stop (referred to as CSS hereinafter) with a magnetic head or a slider when a magnetic recording medium is started and stopped. The plated surface was smoothly polished and textured for preventing sticking to the magnetic head or the slider. After the substrate was cleaned, a chromium underlayer, a magnetic layer of a Co-Cr-Ta alloy and a carbon protective layer were successively formed by, for example, a DC magnetron sputtering apparatus as shown in Sample Nos. 0 to 12 in Table 1. In this case, when the underlayer was formed, the substrate was heated at 200° C. for 30 minutes after a sputtering chamber had been evacuated to $1 \times 10^{-5}$ Torr or less, and the underlayer having each of the thicknesses shown in Table 1 was then formed in the sputtering chamber, into which Ar gas was introduced so as to be maintained at 5 mTorr, under the conditions of charged electric power of 1-10 KW and a layer deposition rate 700-7000 Å/minute. The Co-Cr-Ta alloy magnetic layer of 600 Å thick was formed on the underlayer by the same method as that described above under the conditions of charged electric power 2000 W and a layer deposition rate 1500 Å/minute. The protective layer of 300 Å thick was formed on the magnetic layer under the conditions of charged electric power of 5 KW and a layer deposition rate of 1300 Å/minute. Conventional $Co_{81}Ni_9Pt_{10}$ (No. 16) and $Co_{63}Ni_{30}Cr_7$ alloys (Nos. 13 to 15) were respectively used for forming magnetic layers for the purpose of comparison.

After a liquid lubricant had been applied to the surface of each of the thus-formed magnetic recording media, each of the magnetic recording media was loaded on a 3½ inch disk drive for measuring the signal-noise (S/N) ratio at a frequency of 0 to 10 MHz and corrosion resistance. The results of measurements are shown in Table 1. In this table, the corrosion resistance is expressed by an increase in error after each medium has been allowed to stand in an atmosphere at 80° C. and 80% R.H. for 100 hours. The measurements were made by using a Mn-Zn mini-monolithic metal-in-gap magnetic head (track width: 17 μm and gap length: 0.6 μm) under the conditions of a slider width of 610 μm, a gimbal spring pressure 9.5 gf, a floating height of 0.2 μm at a position with a radius of 24 mm and a rotation speed of a magnetic recording medium of 2400 rpm.

The S/N ratio was measured by the following method:

A signal was first written with linear density 30 kFCI (or any desired density), and the reproduced signal including noise was then measured by a spectrum analyzer within the band of 0 to 10 MHz. The noise of the used measuring instrument including the head noise was then measured by the same instrument under the same conditions, and the noise electric power was then measured by using a rms voltmeter to produce calibration data. The noise of a medium was calculated by comparing the value obtained by subtracting the noise of the measuring instrument from the noise produced during reproduction with the calibration data of rms values. The S/N ratio of each medium was determined by the above-described method.

TABLE 1

| Specimen No. | Magnetic layer (at %) | Thickness of Cr underlayer (Å) | Coersive force Hc (Oe) | S/N ratio (-dB) | Corrosion resistance | Saturated magnetic flux density $4\pi Ms$ (KG) | Average crystal grain size (Å) |
|---|---|---|---|---|---|---|---|
| 0*2 | $Co_{84.5}Cr_{12.5}Ta_3$ | 200 | 700 | 42 | 0 | 8.7 | 200 |
| 1*1 | $Co_{84.5}Cr_{12.5}Ta_3$ | 300 | 800 | 40 | 0 | 8.7 | 200 |
| 2*1 | $Co_{84.5}Cr_{12.5}Ta_3$ | 400 | 950 | 40 | 0 | 8.7 | 200 |
| 3*1 | $Co_{84.5}Cr_{12.5}Ta_3$ | 600 | 1100 | 38 | 0 | 8.7 | 200 |
| 4*1 | $Co_{84.5}Cr_{12.5}Ta_3$ | 800 | 1150 | 38 | 0 | 8.7 | 250 |
| 5*1 | $Co_{84.5}Cr_{12.5}Ta_3$ | 1000 | 1250 | 36 | 0 | 8.7 | 300 |
| 6*2 | $Co_{84.5}Cr_{12.5}Ta_3$ | 1300 | 1300 | 29 | 0 | 8.7 | 350 |
| 7*1 | $Co_{90}Cr_7Ta_3$ | 400 | 910 | 37 | 0 | 9.8 | 300 |
| 8*2 | $Co_{94}Cr_3Ta_3$ | 400 | 800 | 25 | 8-10 | 10.5 | 400 |
| 9*2 | $Co_{79}Cr_{18}Ta_3$ | 400 | 860 | 35 | 0 | 6.5 | 150 |
| 10*2 | $Co_{88}Cr_{12}$ | 400 | 720 | 24 | 2-5 | 9.5 | 400 |
| 11*1 | $Co_{83}Cr_{12}Ta_5$ | 400 | 930 | 39 | 0 | 8.0 | 150 |
| 12*2 | $Co_{79}Cr_{12}Ta_9$ | 400 | 600 | 20 | 0 | 6.7 | <100 |
| 13*3 | $Co_{63}Ni_{30}Cr_7$ | 400 | 250 | *4 | *4 | 10.7 | 600 |
| 14*3 | $Co_{63}Ni_{30}Cr_7$ | 1500 | 800 | 24 | 7-8 | 10.7 | 600 |
| 15*3 | $Co_{63}Ni_{30}Cr_7$ | 2200 | 1100 | 26 | 7-8 | 10.7 | 600 |
| 16*3 | $Co_{81}Ni_9Pt_{10}$ | 0 | 980 | 27 | 4-5 | 11.2 | 500 |

*1 Alloy of the present invention
*2 Comparative alloy
*3 Conventional alloy
*4 Unmeasurable It is apparent from the table that the specimens formed by using the conventional alloy $Co_{63}Ni_{30}Cr_7$ or $Co_{81}Ni_9Pt_{10}$ have high saturated magnetic flux density but low S/N ratios and poor corrosion resistance and that the use of Co-Ni-Cr enables an increase in coercive force only when the thickness of a chromium underlayer is increased to 2000 Å or more.

It is also found that each of the media of the present invention using Co-Cr-Ta alloys has an average crystal grain size of as small as 100 to 300 Å, and that the coercive force thereof is increased as the thickness of the chromium-underlayer is gradually increased from 200 Å. FIG. 2 shows the photograph of the magnetic layer of Specimen No. 3 shown in Table 1 which was measured by electron microscopy. It was observed from the photograph that the average crystal grain size of the magnetic layer was 200 Å. The average crystal grain sizes of the magnetic layers of other specimens were measured by the same method. However, Specimen No. 6, in which the thickness of the chromium underlayer was 1300 Å, has a crystal grain size of over 300 Å and exhibits a low S/N ratio. Specimen Nos. 1 to 5, in each of which the thickness of the chromium-underlayer was 300 to 1000 Å, exhibit high coercive force and high S/N ratios.

Specimen No. 8 containing less than 5 at % of Cr, Specimen No. 10 containing an insufficient amount of Ta and Specimen No. 12 containing excessive Ta respectively have the chromium underlayers with appropriate thicknesses but exhibit low S/N ratios.

Specimen Nos. 9 and 12 containing excessive Cr and Ta show low $4\pi Ms$ values, and the specimens containing a small amount of Ta+Cr exhibit poor corrosion resistance.

FIG. 1 shows a relationship between the coercive force and the thickness of an underlayer obtained by changing the thickness of the chromium underlayer on which a magnetic layer composed of $Co_{85}Cr_{12}Ta_3$ or $Co_{63}Ni_{30}Cr_7$ was formed. The Co-Ni-Cr alloy shows coercive force Hc of 800 Oe or more when the thickness of the chromium underlayer is 1500 Å or more, while the Co-Cr-Ta alloy having a smaller average crystal grain size shows coercive force (Hc) of 800 Oe or more when the thickness is 300 Å or more.

In this embodiment, although metallic chromium is used as a material for forming an underlayer, the underlayer may be formed by using any one of other chromium alloys such as Cr-Mo, Cr-V, Cr-Mn and the like. In addition, an alloy basically consisting of 5 to 15% or Cr, 1 to 8% of Ta and the balance of Co and Co-Cr-Ta alloys containing other elements can be used as materials for forming magnetic layers. Further, the material used in this embodiment and any other metallic materials and non-metallic materials can be used as non-magnetic materials for forming substrates.

What is claimed is:

1. A magnetic recording medium comprising:
a substrate made of a non-magnetic material;
an underlayer which is formed on said substrate and has a thickness of 300 to 1000 Å and which consists of a chromium metal or a chromium alloy; and
a magnetic recording layer which is grown on said underlayer by deposition, which consists essentially of 5 to 15 at % of Cr, 1 to 8 at % of Ta and the balance substantially being Co, which has an average crystal grain side of 100–300 Å, and which has a direction of easy magnetization in the plane of the surface of said substrate.

2. A magnetic recording medium comprising:
a substrate made of a non-magnetic material;
an underlayer which is formed on said substrate and has a thickness of 300 to 1000 Å and which consists of a chromium metal or a chromium alloy; and
a magnetic recording layer which is epitaxially grown on said underlayer by deposition, which consists essentially of 5 to 15 at % of Cr, 1 to 8 at % of Ta and the balance substantially being Co, which has an average crystal grain size of 100 to 300 Å, and which has a direction of easy magnetization in the plane of the surface of said substrate.

3. A magnetic recording medium comprising:
a substrate made of a non-magnetic material;
an underlayer which is formed on said substrate and has a thickness of 300 to 1000 Å and which consists of a chromium metal or a chromium alloy;
and a magnetic recording layer which consists of 5-15 at % of Cr, 1-8 at % of Ta, and the balance being Co, grown on said underlayer by deposition and having an average crystal grain size of 100 to 300 Å and which has a direction of easy magnetization in the plane of the surface of said substrate.

* * * * *